June 23, 1925.
T. H. CUMMINGS
1,543,426
POWER ATTACHMENT FOR MOTOR VEHICLES
Filed Dec. 27, 1921  2 Sheets-Sheet 1
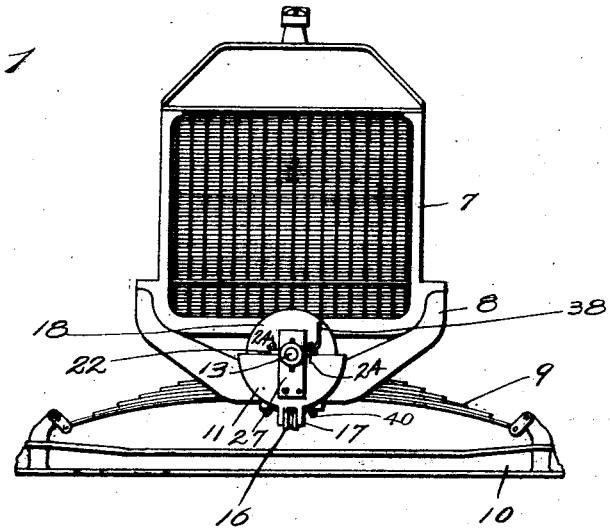
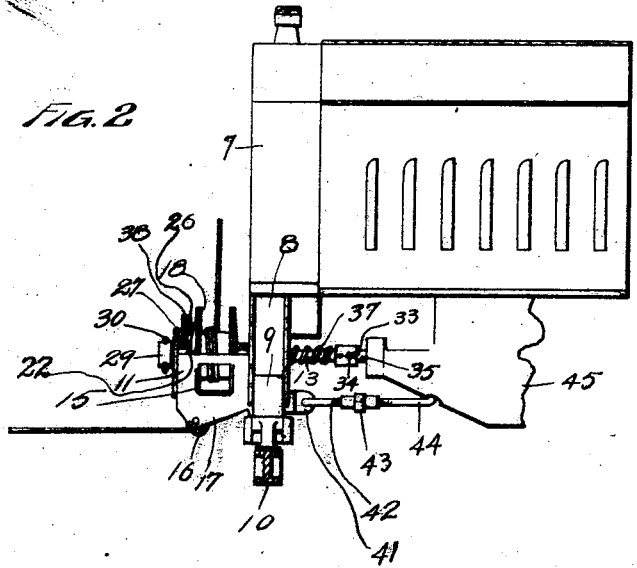
INVENTOR
THOMAS H. CUMMINGS
BY Edward E. Longan
ATTY.

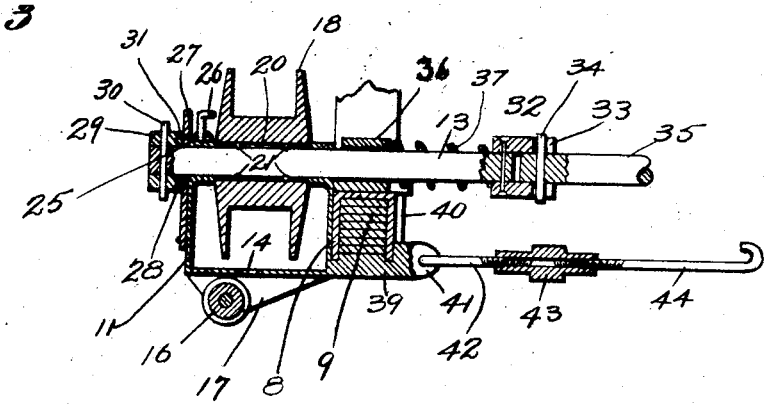
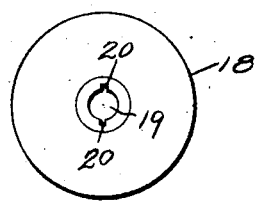
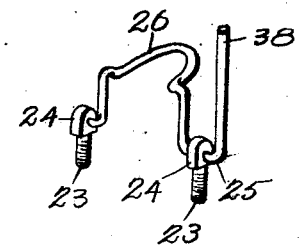
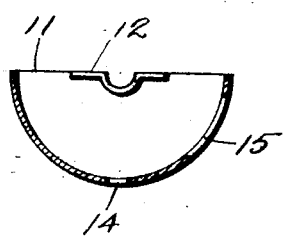

Patented June 23, 1925.

1,543,426

UNITED STATES PATENT OFFICE.

THOMAS H. CUMMINGS, OF ST. LOUIS, MISSOURI.

POWER ATTACHMENT FOR MOTOR VEHICLES.

Application filed December 27, 1921. Serial No. 524,839.

*To all whom it may concern:*

Be it known that I, THOMAS H. CUMMINGS, a citizen of the United States, and resident of the city of St. Louis and State of Missouri, have invented certain new and useful Improvements in Power Attachments for Motor Vehicles, of which the following is a specification containing a full, clear, and exact description, reference being had to the accompanying drawings, forming a part hereof.

My invention relates to improvements in power attachments for motor vehicles, and has for its primary object an attachment which is adapted to be secured to the front end of the motor vehicle and driven by the engine from which power may be obtained to be utilized for various purposes.

A further object is to construct a power device for automobiles by the use of which the vehicle can pull itself out of mud holes and ditches, and pull other vehicles out of mud holes and ditches without placing any strain on the driving mechanism, such as transmission and rear axles of the vehicle doing the pulling.

A still further object is to construct a power attachment for motor vehicles, by means of which a variety of machinery can be placed in operation.

In the drawings,

Fig. 1 is a front elevation of a portion of a motor vehicle with my device in position.

Fig. 2 is a side elevation of the same.

Fig. 3 is an enlarged longitudinal cross section of my device with portions of the vehicle shown.

Fig. 4 is an end view of the pulley made use of.

Fig. 5 is a perspective view of the disengaging lever.

Fig. 6 is a cross section of the pulley housing.

In the construction of my device I employ a motor vehicle 7. This vehicle is provided with a yoke 8, to which the spring 9 is secured, the ends of the spring 9 being in turn secured to the axle 10 in any suitable manner. Secured to the yoke 8, and beneath the spring 9 is a pulley housing 11. This pulley housing is provided with journals 12, in which the shaft 13 is located. The pulley housing has formed therein openings 14 and 15. The opening 14 is formed in the bottom of the housing and directly over a sheave wheel 16 which is pivotally mounted between ears 17 formed integral with the underside of the housing. The purpose of this opening will be explained later. The opening 15 is formed for the purpose of permitting a belt to be used. This belt passing around the pulley 18. The pulley 18 is provided with a central bore 19 and a pair of keyways 20, and in these keyways extend pins 21 which pass through the shaft 13, thus holding the pulley 18 against rotation on the shaft 13. In order to secure the shaft 13 within the journals 12, I employ caps 22. The forward cap is held on the housing by screws 23 which have instead of heads, perforated projections 24, and in the perforations of these projections is pivotally mounted a disengaging lever 25. This lever is provided with an offset portion 26 which is adapted to contact with a spring plate 27. This plate is secured to the front wall of the housing 11, and is provided with an opening 28, through which the shaft 13 extends. This opening, however, is larger than the shaft. Secured to the front end of the shaft is a collar 29. This collar is secured by means of a pin 30, which pin projects on both sides of the collar, and is for the purpose of permitting the engagement of a starting crank, so that the engine of the vehicle can be cranked. Interposed between the plate 27 and collar 29 is a friction washer 31. The shaft 13 extends rearwardly, and is provided at its rear end with a socket or sleeve 32. This sleeve is provided with slots 33 to engage with the pin 34 which extends through the engine shaft 35. This pin is present on practically every motor vehicle engine, and is for the purpose of permitting the engagement of a starting crank. When this pin is not present, it will be necessary to equip the crank shaft of the motor with the pin. The shaft 13 also passes through a bearing 36. This bearing is present in all machines and serves as a steady rest for the starting crank, and between the bearing 36 and collar 32 is interposed a coil spring 37, which tends to normally force the collar 32 over the shaft 35, so that it can engage with the pin.

When it is desired to throw my device out of gear, the disengaging lever 25 is moved forward by means of a handle 38. This permits the portion 26 to contact with the plate 27, and due to the manner in which the pulley 18 is mounted on the shaft.

the shaft can slide forward and disengage the collar 32 from the crank shaft.

When it is desired to use my device to pull, a rope is made use of as illustrated in Fig. 2. This rope is wound around the pulley 18 several times. One end of the rope is passed through the opening 14 and around the sheave wheel 16, and the other end is then attached to the object to be moved. The engine is then started and the pulley revolves freely until the free end of the rope is grasped and pulled. When utilized in this manner, my device operates similar to a capstan or niggerhead, and the rope is drawn in. I may either use a direct pull on a single rope or in the event greater power is needed, I may utilize a block and tackle. The housing 14 is provided with an extension 39 which passes to the rear of the yoke for the reception of bolts 40, which assist in securing the device to the yoke 8. This rearward extension is provided with a perforated ear 41, to which a rod 42 is attached. This rod is provided on its rear end with a turn buckle 43, which is also attached to a rod 44, the rod 44 is attached to the crank case 45 of the engine of a motor vehicle in any suitable manner, and is for the purpose of stabilizing the housing 11 and taking off some of the strain from the yoke 8, or in other words, assists in distributing the strain put on the housing 11, to the chassis of the vehicle. It will be seen from my construction, that the device can be permanently attached and can be disengaged from the engine when it is not desired to use the same, but can be engaged for starting purposes or power purposes, and still not interfere with the running of the machine.

While I have shown my device attached to a specific construction of motor vehicle, still it is obvious that with some slight changes, the device can be adapted to any style of motor vehicle.

Having fully described my invention, what I claim is:

1. A power device for motor vehicles, comprising in combination with a motor vehicle and its engine, a housing secured to said vehicle, a shaft slidably mounted in said housing, a pulley slidably mounted on said shaft and rotatable therewith, means for sliding said shaft for engaging and disengaging said shaft with the engine of said vehicle, and a sheave wheel mounted in said housing below and at right angles to said pulley.

2. A power device for motor vehicles comprising a double flanged pulley, a shaft slidably mounted through said pulley, a lever for sliding said shaft in and out of engagement with the crank shaft of a motor vehicle engine, a spring for normally holding said shaft in engagement with said crank shaft, and a sheave wheel having its axis at right angles to the axis of the pulley located below said pulley.

3. A power device for motor vehicles comprising in combination with a motor vehicle and its engine, a housing secured to said vehicle, a shaft slidably mounted in said housing, a pulley slidably mounted on said shaft and rotatable therewith, a lever for sliding said shaft for engaging and disengaging the same with the engine shaft of said vehicle, a spring for normally holding said shaft in engagement with the engine shaft, and a sheave wheel pivotally secured in said housing, said sheave wheel being located below the pulley and having its axis at right angles to the axis of the pulley.

4. A power device for motor vehicles, comprising a pulley, a shaft slidably extending through said pulley, a spring for normally holding said shaft in engagement with the engine shaft, a lever for sliding said shaft so as to disengage said shaft from the engine shaft of the vehicle, and a sheave wheel located below and at right angles to said pulley.

5. A power device for motor vehicles, comprising in combination with a motor vehicle and its engine, a housing secured to said vehicle, a shaft slidably mounted in said housing, a pulley slidably mounted on said shaft and rotatable therewith, a spring for normally holding said shaft in engagement with the engine shaft, a collar carried by said shaft, a spring plate carried by the housing and contacting with said shaft, a lever adapted to bear against said plate for disengaging said shaft and engine shaft, perforated ears formed integral with said housing, and a sheave wheel rotatably supported between said ears, the axis of said sheave wheel being at right angles to the axis of the pulley.

In testimony whereof, I have signed my name to this specification.

THOMAS H. CUMMINGS.